United States Patent [19]
Betts

[11] Patent Number: 6,137,829
[45] Date of Patent: Oct. 24, 2000

[54] SYSTEM AND METHOD FOR TRANSMITTING SPECIAL MARKER SYMBOLS

[75] Inventor: William L. Betts, St. Petersburg, Fla.

[73] Assignee: Paradyne Corporation, Largo, Fla.

[21] Appl. No.: 08/979,455

[22] Filed: Nov. 26, 1997

Related U.S. Application Data

[60] Provisional application No. 60/039,851, Mar. 5, 1997, and provisional application No. 60/037,191, Mar. 6, 1997.

[51] Int. Cl.[7] .................................................... H04L 5/12

[52] U.S. Cl. .......................... 375/222; 375/261; 375/264; 375/269; 375/298; 375/324; 375/340; 370/207; 379/93.08; 329/304; 332/103

[58] Field of Search ...................................... 375/222, 260, 375/261, 264, 268, 269, 298, 300, 320, 340, 353, 259, 295, 316, 324; 329/304; 332/103; 370/206, 207, 522; 379/93.01, 93.08

[56] References Cited

U.S. PATENT DOCUMENTS

| | | | |
|---|---|---|---|
| 3,775,688 | 11/1973 | Hinoshita et al. | 375/320 |
| 4,627,077 | 12/1986 | Armstrong | 375/261 |
| 5,103,227 | 4/1992 | Betts | 341/61 |
| 5,444,712 | 8/1995 | Betts et al. | 370/207 |
| 5,751,774 | 5/1998 | Wang | 375/367 |

*Primary Examiner*—Amanda T. Le
*Attorney, Agent, or Firm*—Thomas, Kayden, Horstemeyer & Risley

[57] ABSTRACT

A system and method for the transmission of additional special marker symbols in a circular signal space constellation allows the communication of additional control information without requiring any additional power to transmit the additional symbol. Additional symbols can include "Start of Message", "End of File", "End of Transmission", "Increase Data Rate", "Decrease Data Rate", "Save State" or "Clear", or any additional command signal desired to be transmitted.

21 Claims, 6 Drawing Sheets

Microfiche Appendix Included
(1 Microfiche, 16 Pages)

64 POINT CIRCULAR
CAP CONSTELLATION
WITH SPECIAL MARKER
SYMBOLS

64 POINT SQUARE
CAP CONSTELLATION

SYSTEM AND METHOD FOR TRANSMITTING SPECIAL MARKER SYMBOLS

CROSS REFERENCE TO RELATED APPLICATION

This application claims priority to and the benefit of the filing date of copending and commonly assigned provisional patent application entitled CIRCULAR CONSTELLATIONS FOR UNCODED MODULATION, assigned Ser. No. 60/039,851, and filed Mar. 5, 1997 and copending and commonly assigned provisional patent application entitled CIRCULAR PRECODING AND NONLINEAR ENCODING assigned Ser. No. 60/037,191, and filed Mar. 6, 1997 the text of both provisional applications being hereby incorporated by reference.

FIELD OF THE INVENTION

The present invention relates generally to data communications, and more particularly, to a system and method for communicating special marker symbols using circular signal space constellations.

BACKGROUND OF THE INVENTION

The field of data communications typically uses a modem to convey information from one location to another. Digital Subscriber Line (DSL) technology now enables modems to communicate large amounts of data. Modems communicate by modulating a baseband signal carrying digital data, converting the modulated digital data signal to an analog signal, and transmitting the analog signal over a conventional copper wire pair using techniques that are known in the art. These known techniques include mapping the information to be transmitted into a multidimensional signal space constellation. In some instances, a onedimensional signal space constellation can be employed, such as in the case of pulse amplitude modulation (PAM). The constellation can include both analog and digital information or only digital information.

In the above mentioned communications system, typically both digital data and an analog signal are to be transmitted. The data signal to be transmitted is represented by a sequence of data symbols, where each data symbol is associated with a particular N-dimensional signal point value taken from a signal space. Similarly, the analog signal, which for example can be represented by a voice signal, is processed so that it is mapped into the N-dimensional signal space to provide a voice signal point. This voice signal point defines the magnitude and angle of a voice signal vector about the origin of the signal space. The data symbol and the voice vector are then added together to select a resultant N-dimensional signal point. These N-dimensional signal points are grouped into signal space constellations and then transmitted to a far-end modem.

Upon reception of the transmitted N-dimensional signal point, the receiver of the far-end modem detects the embedded data symbol and subtracts the data symbol from the received N-dimensional signal point to yield the voice signal vector. This voice signal vector is then used to recreate the voice signal.

Square signal space constellations typically have a higher peak factor, and typically require more power to transmit a given amount of information than circular constellations. Square constellations also have a greater susceptibility to harmonic distortion. For example, in a 256 point two dimensional circular constellation, the constellation point, or symbol, with the highest power has the x, y coordinates 17, 5 with a peak power of $17^2+5^2=314$, whereas the highest power point in a square constellation has the x, y coordinates 15, 15 with a peak power of $15^2+15^2=450$. As can be seen, the peak power of a circular constellation is 1.6 dB lower than that of a square constellation.

In the above mentioned communications system it would be beneficial to allow the transmission of additional special marker symbols in a signal space constellation. These special markers can be used to convey a number of command and control functions from one communication device to another. Square constellations encode exactly N-bits in a constellation with $2^N$ points. This eliminates the possibility of transmitting any additional special marker symbols. Therefore a need exists for the ability to transmit additional special marker symbols in a signal space constellation.

SUMMARY OF THE INVENTION

Because of the incorporation of circular signal space constellations, the present invention makes the convenient and efficient transmission of additional special marker symbols possible. The present invention provides a system and method for transmitting a plurality of additional symbols in a circular signal space constellation. The invention incorporates a marker encoder configured to encode an additional special marker into an additional symbol. This additional symbol, representing any one of a number of additional commands, such as "Start of Message", "End of File", "End of Transmission", "Increase Data Rate", "Decrease Data Rate", "Save State" or "Clear" is added to a value of $2^N$ and then transmitted in a circular signal space constellation in accordance with the technique disclosed in commonly assigned and co-pending U.S. patent application Ser. No. 08/915,980, titled "SYSTEM AND METHOD FOR USING CIRCULAR CONSTELLATIONS WITH UNCODED MODULATION" filed on Aug. 21, 1997. The present invention includes a transmitter configured to transmit the additional symbol in a circular signal space constellation and a receiver configured to receive the circular signal space constellation containing the additional special symbol. A subtractor configured to subtract the value of $2^N$ from the received signal so as to decode the additional symbol is also included in the receiver. A marker decoder configured to decode the additional symbol into the additional special marker is also included. Any number of additional special marker symbols may be transmitted.

In a preferred embodiment of the present invention a marker encoder receives special marker symbols such as "End of File", "Start of Message", "End of Transmission", "Increase Data Rate", "Decrease Data Rate", or "Clear" and supplies them in the form of an encoded symbol "b", which is added to a value of $2^N$ and supplied as an N+1 bit word to the register alternatively with the N bit word. The N bit word is supplied from an ISA bus to an N+1 bit register which separates the N bit word into N−1 most significant bits (msb's) and 2 least significant bits (lsb's). The 2 additional bits are the least significant bits such that larger numbers of bits are easily accomodated in the most significant bit positions. An International Standards Architecture (ISA) bus is an industry standard which eliminates the need for signal interfaces and is well known in the art. Based upon the data rate capacity of the channel, groups of 16 or 32 bit words are converted into frames of N bit words where N is determined by the data rate capacity of the channel. In order to allow the transmission of fractional bit rates as is known in the art of data communications, the register can optionally include a modulus converter or other means, such as constellation switching or shell mapping to enable the transmission of fractional bit rates. The N−1 msb's are next supplied to a mapper, which maps the signal into a multidimensional circular signal space constellation. Optionally, an N bit word is supplied first to a scrambler. The scrambler performs an operation on the N bit word that results in a scrambled N bit word. While in the preferred embodiment the special marker symbols are not scrambled, they can be.

Next, the signal is operated upon by a phase encoder which is designed to develop a rotation vector using the 2 lsb's supplied by the register. This rotation vector is combined in a rotator with the mapped N−1 bit vector representing the N−1 msb's to form the circular signal space constellation of the present invention and creates a phase rotated signal. Optionally, the phase encoder includes a differential encoder which encodes the 2 lsb's of the N bit word to develop 2 differential bits. These 2 differential bits are added to the 2 lsb's supplied from the register and become part of the rotation vector.

The phase rotated signal is then modulated using either carrierless amplitude/phase (CAP) modulation or any coded or uncoded modulation scheme such as trellis coding, quadrature amplitude modulation (QAM), or pulse amplitude modulation (PAM), and then transmitted over a communication channel comprising a conventional wire pair. In the case of PAM modulation, the signal space is onedimensional instead of multidimensional as in QAM, however, the concepts of the present invention are equally applicable thereto. At a receiver, the transmitted phase rotated signal is received and demodulated in accordance with techniques that are known in the art of modem communications. A phase decoder which includes a phase slicer operates on the received signal and supplies a signal to a vector rotation operator which provides a derotation vector. The derotation vector is combined with the circular signal space constellation in a rotator which recovers the mapped N−1 bit vector representing the N−1 msb's. Optionally, the output of the phase slicer is supplied to a differential decoder which develops 2 differential bits in order to recover the 2 lsb's of the N bit word. The 2 differential bits are subtracted from the output of the phase slicer and input to a register. As in the transmitter, the register can include a device such as a modulus converter, or other means such as constellation switching or shell mapping in order to allow the transmission of fractional bit rates.

The signal space constellation is then sliced, as is known in the art, in order to recover the mapped N−1 msb's. Lastly, the N-1 msb's are combined with the 2 lsb's and, if scrambled, the N bit word is descrambled in order to output an unscrambled N bit word.

The register supplies the N+1 bit word to a subtractor where a value of $2^N$ is subtracted from the N+1 bit word. This output is then supplied to a marker decoder which will separate the special marker symbol from the received N bit word.

Various modulation techniques may benefit from the concepts and features of the present invention. For example, the present invention will function equally well using carrierless amplitude/phase (CAP) modulation, or any coded or uncoded modulation such as trellis coding, QAM or PAM.

The invention has numerous advantages, a few of which are delineated hereafter, as merely examples.

An advantage of the present invention is that it permits the transmission of special marker signals as symbols added to the perimeter of a circular signal space constellation.

Another advantage of the present invention is that it provides for seamless data rate changing by designated special symbols. As data rate increases, N increases and unique special marker symbols are retained by adding $2^N$.

Another advantage of the present invention is that it provides for very fast multi-point synchronization by using a simple designated special Start of Message "SOM" marker to signal the arrival of a new message. The special marker symbols are high power symbols developed by adding $2^N$ to a power indexed signal constellation. They have maximum margin for distinguishing them from the idle channel signal which precedes each multi-point transmission, thus making them easy to distinguish.

Another advantage of the present invention is that it is simple in design, reliable in operation, and its design lends itself to economical mass production in modems.

Other features and advantages of the present invention will become apparent to one with skill in the art upon examination of the following drawings and detailed description. It is intended that all such additional features and advantages be included herein within the scope of the present invention, as defined in the appended claims.

BRIEF DESCRIPTION OF THE DRAWINGS

The present invention, as defined in the claims, can be better understood with reference to the following drawings. The drawings are not necessarily to scale, emphasis instead being placed on clearly illustrating the principles of the present invention.

DETAILED DESCRIPTION OF THE PREFERRED EMBODIMENT

The present invention can be implemented in software, hardware, or a combination thereof. In the preferred embodiment, the elements of the present invention are implemented in software that is stored in a memory and that configures and drives a suitable digital signal processor (DSP) situated in the respective modem. However, the foregoing software can be stored on any computer-readable medium for use by or in connection with any suitable computer-related system or method. In the context of this document, a computer-readable medium is an electronic, magnetic, optical, or other physical device or means that can contain or store a computer program for use by or in connection with a computer-related system or method.

Figure 1B:
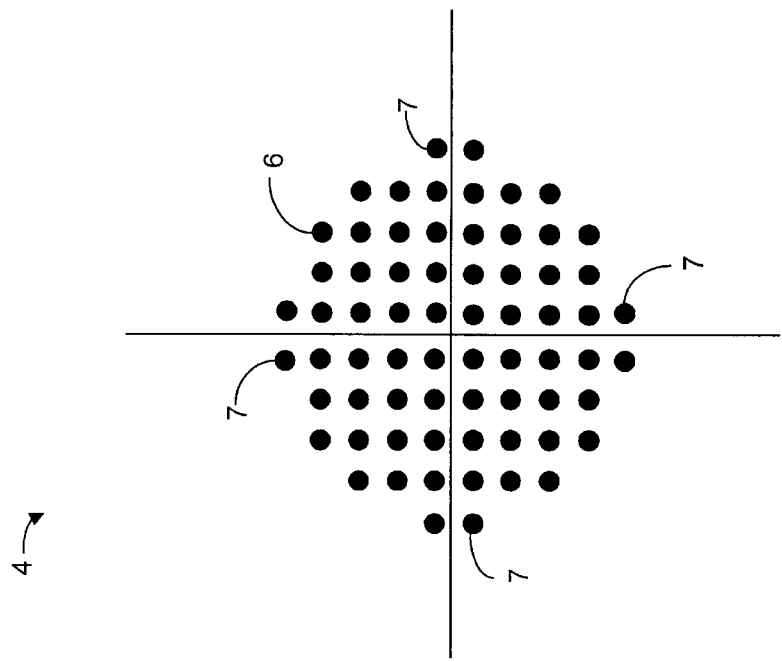
FIG. 1B is a graphical representation of a 64 point CAP circular signal space constellation including special marker symbols.
Figure 1A:
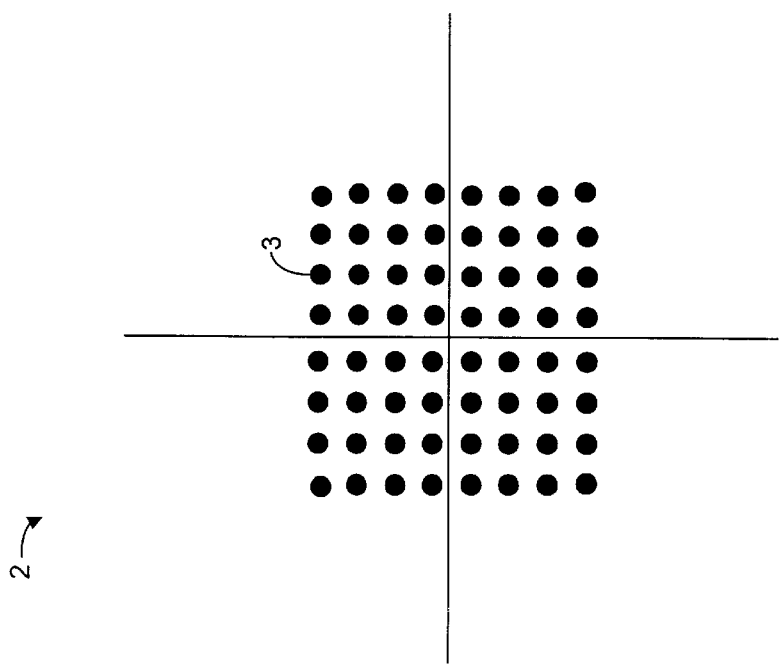
FIG. 1A is a graphical representation of a 64 point CAP square signal space constellation.

Referring now to FIG. 1A, shown is a graphical representation of a 64 point uncoded CAP square signal space constellation 2. The in-phase and quadrature samples developed by a CAP modulation scheme, as is known in the art, specify a location 3 in the signal space of FIG. 1A. The set of possible samples that a CAP modulator can produce corresponds to a set of sample points, or a constellation of points. For simplicity, a constellation of 64 points is described, however, as is known in the art, constellations with a larger number of signal points are possible.

Referring now to FIG. 1B, shown is a graphical representation of a 64 point uncoded CAP circular signal space constellation 4. As in a square constellation, the in-phase and quadrature samples developed by a CAP modulation scheme specify a location 6 in the signal space of FIG. 1B. For simplicity the circular constellation depicted in FIG. 1B contains 68 signal points, including four special marker symbols, however many other configurations are possible. While the following preferred embodiment describes the generation of signal space constellations using uncoded carrierless amplitude/phase (CAP) modulation, other modulation techniques, such as QAM modulation, or PAM modulation can also employ the concepts and features of the present invention. In fact, any modulation technique, including one that uses trellis coding can be used.

Figure 2:
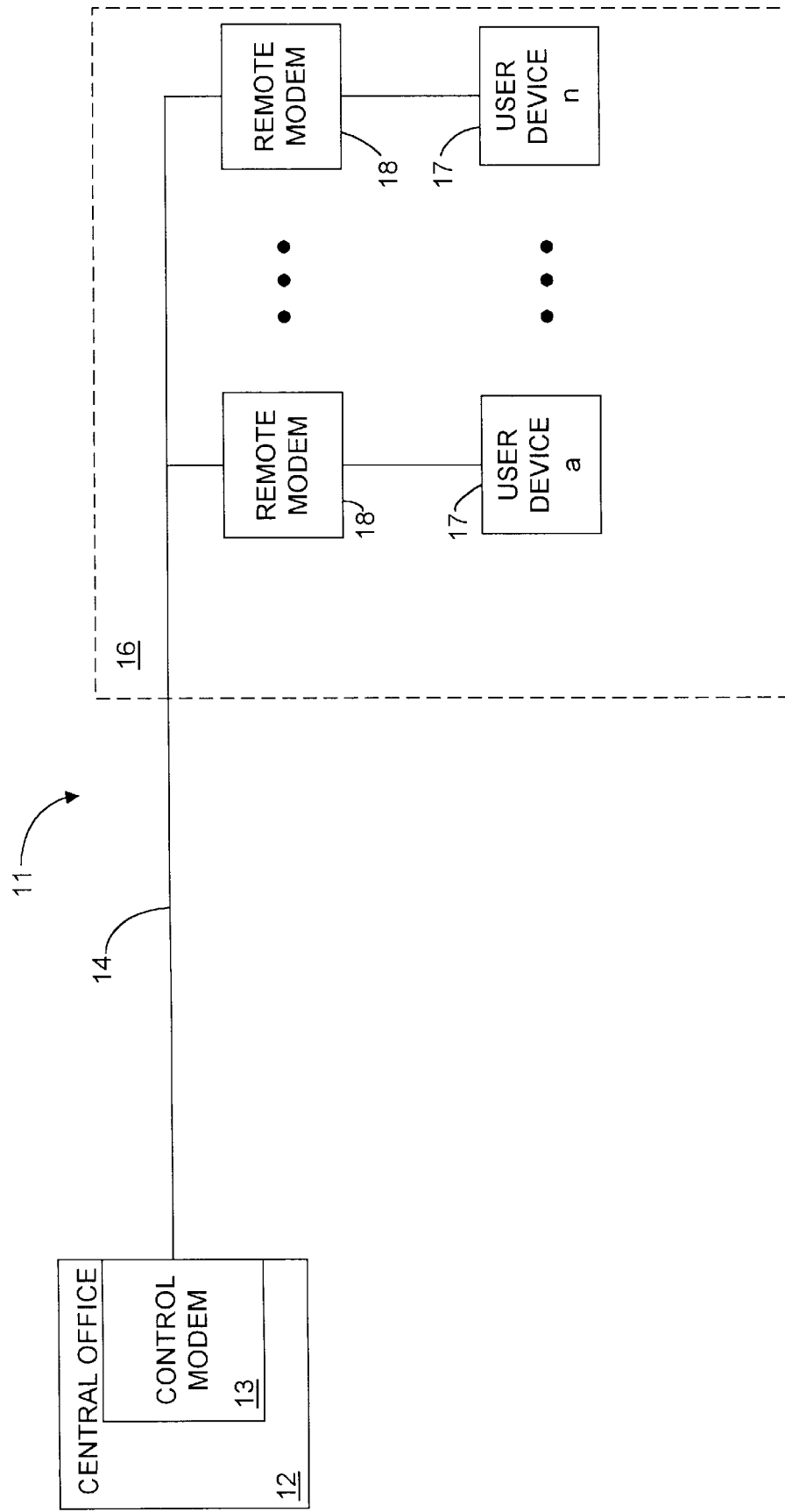
FIG. 2 is a schematic view of a multipoint communications channel including modems employing the concepts and features of the present invention.

Referring now to FIG. 2, shown is a view illustrating a multipoint communication channel in which modems 18 and 13 employing the concepts and features of the present invention are used. Remote location 16 is connected to central office location 12 and control modem 13 via communication channel 14. Channel 14 is typically the copper wire pair that runs between a telephone company central office and a remote residential, business, or any other location. Remote location 16 may contain a plurality of modems 18 connecting a plurality of user devices 17 to communication channel 14. Remote location 16 can be a residential, business, or other location served by a conventional copper wire pair. By using modems 18 and 13 employing the concepts and features of the present invention, it is possible to transmit and receive additional special marker symbols as points added to the perimeter of a circular signal space constellation. While the following preferred embodiment is described with reference to remote modem 18, the concepts and features of the present invention are equally applicable to control modem 13.

Figure 3:
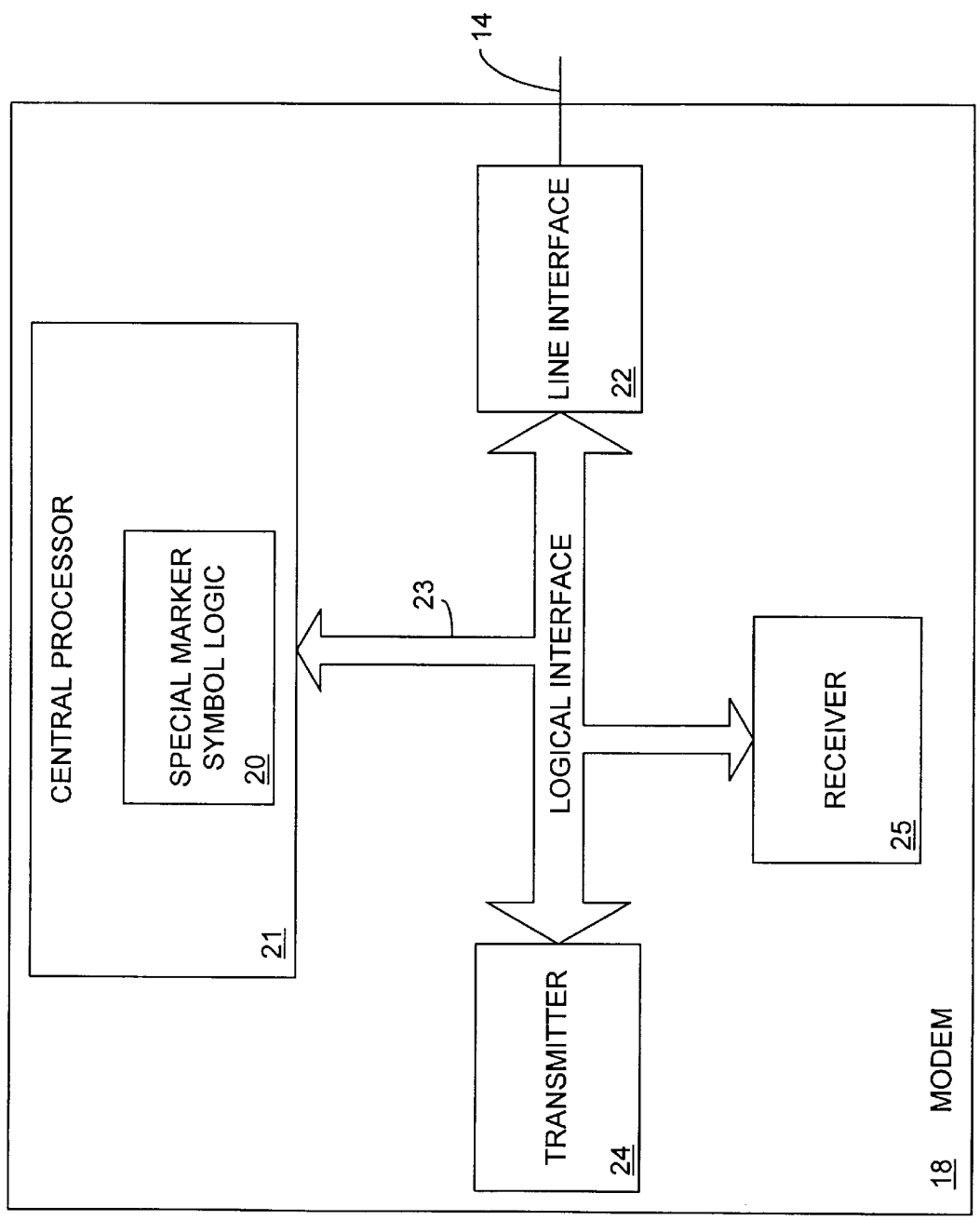
FIG. 3 is a schematic view illustrating a modem of FIG. 2 employing the concepts and features of the present invention.

Now referring to FIG. 3, shown is a schematic view illustrating a modem 18 of FIG. 2. Modem 18 contains conventional components as is known in the art of data communications. Central processor 21 controls the operation of the modems' transmitter 24 and receiver 25 through logical interface 23, and contains logic 20 configured to enable transmitter 24 and receiver 25 to communicate additional special marker symbols. The components of the modem connect to communications channel 14 through line interface 22. By employing the concepts and features of the present invention, the transmission of additional special marker symbols using circular signal space constellations is possible.

Figure 4:
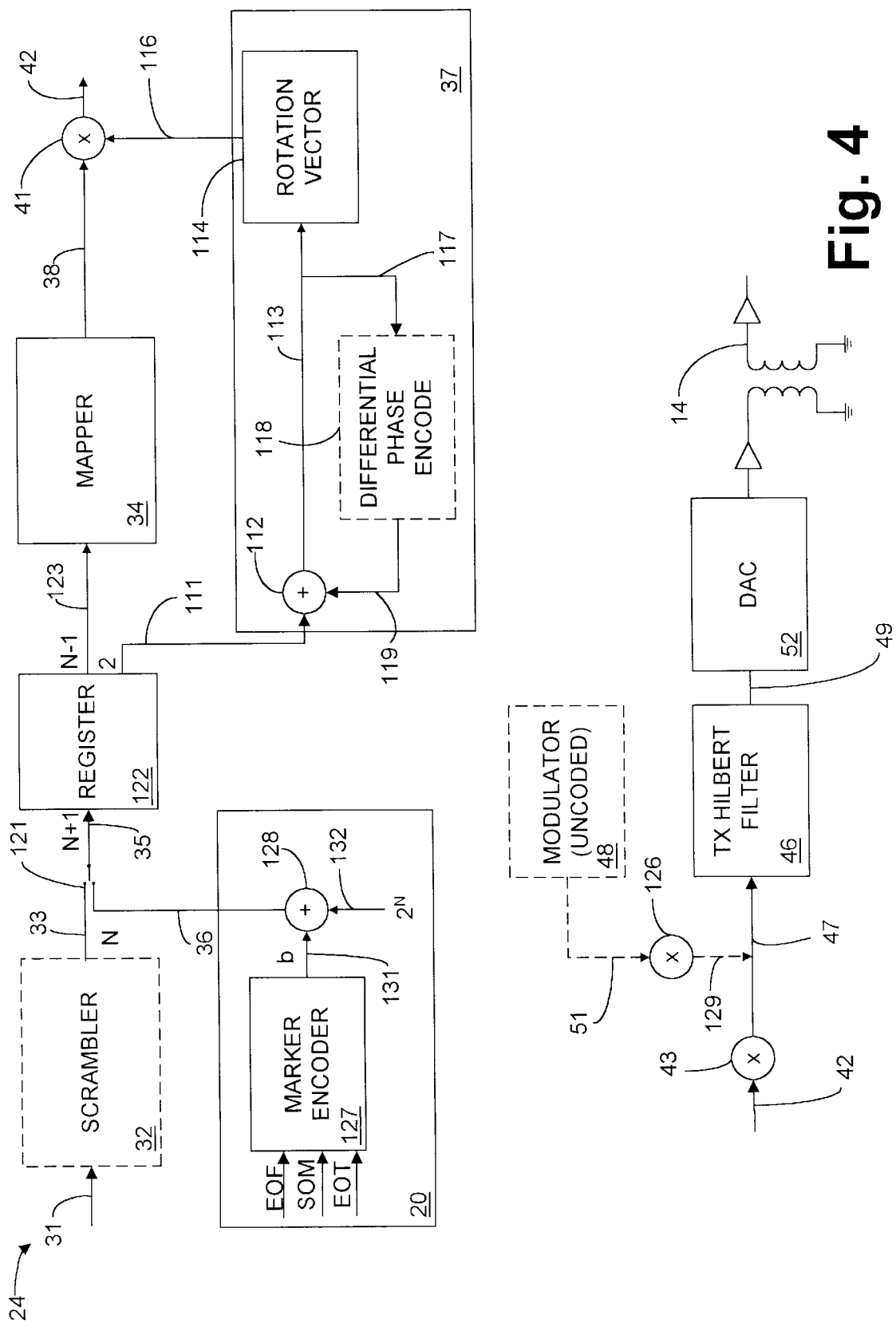
FIG. 4 is a schematic view of the transmitter section of the modem of FIG. 3 including the present invention.

With reference to FIG. 4, shown is a preferred embodiment of a transmitter 24 of modem 18 employing the concepts and features of the present invention. An ISA bus, a standard computer bus which eliminates the need for interfaces, supplies data, in the form of a data word that can be either 16 or 32 bits for the preferred embodiment, on line 33 to register 122. This data word is transformed into an N bit word by counting bits and shifting to arrive at a smaller number of bits, in this example, an N bit data word is segmented into 2 lsb's and N−1 additional bits. By employing a circular constellation, N can be any number. Optionally, in order to allow the transmission of fractional bit rates as is known in the art of data communications, register 122 can include a modulus converter or other means such as constellation switching or shell mapping. Modulus conversion is a well known technique in the art of communications for allowing the transmission of fractional bit rates, and is described in U.S. Pat. No. 5,103,227. Constellation switching allows the transmission of fractional bit rates by, for example, first transmitting 6 bits in one symbol and 7 bits in the next symbol if it is desired to transmit 6½ bits. For 6¾ bits one would transmit 7 bits per symbol for three symbol cycles and transmit 6 bits per symbol for the fourth symbol cycle. Shell mapping blocks the data into frames and a shell mapping algorithm, such as that described in the V.34 specification, is used to map the frames of data into a constellation of a certain size.

Optionally, the N bit word is first input on line 31 to scrambler 32. Scrambler 32 can be either a self synchronized scrambler or a preset free running scrambler as is known in the art. Depending on the application, the preset scrambler may have some advantage, as in the case of using Reed-Solomon coding. If scrambler 32 is employed, a scrambled N bit word is output on line 33.

Special marker logic 20 allows the easy and reliable transmission of special marker symbols in the circular signal space constellation of the present invention. In order to transmit special marker symbols, marker encoder 127 supplies special marker symbols such as "End of File" (EOF), "Start of Message" (SOM) "End of Transmission" (EOT), or any other special marker that is desirable to send, in the form of an encoded symbol "b" on line 131. An example of the output of marker encoder 127 is given in Table 1. Note that the "SOM" and "EOF" special symbols may use the same markers because "SOM" is preceded by an idle channel and "EOF" is preceded by normal data transmission. The N+1 bit word is shown for the example, with N=6.

TABLE 1

| Symbol | b | N + 1 Word | N − 1 Word | 2LSB's |
| --- | --- | --- | --- | --- |
| SOM | 0 | 1000000 | 10000 | 00 |
| EOF | 0 | 1000000 | 10000 | 00 |
| Dec. Data Rate | 1 | 1000001 | 10000 | 01 |
| Incr. Data Rate | 2 | 1000010 | 10000 | 10 |
| EOT | 3 | 1000011 | 10000 | 11 |
| ISA Data |  | 0MMMMLL | 0MMMM | LL | where L represents the least significant bits and M represents the most significant bits.

The encoded symbol is added in adder 128 to a value of $2^N$ on line 132 and supplied to register 122 on line 36 alternatively with the output of scrambler 32 through switch 121. Switch 121 is logically controlled to include the special marker symbol as input to line 35 resulting in N+1 bits input to register 122. In the case of modulus conversion to a constellation of size 4M, adder 128 would add 4M on line 132, instead of $2^N$, to encoded symbol "b".

The resulting N−1 msb's on line 123 are supplied to mapper 34 which maps the N−1 msb's into a multidimensional circular signal space constellation, resulting in mapped N−1 msb's, represented by a 2-dimensional vector, supplied on line 38 to rotator 41. The N−1 msb's are enlarged by $2^{N-2}$ resulting in the possibility of a word larger than N−2 bits if "b" is transmitted. By using a single mapper, the N−1 msb's can expand, as shown by Table 1, while still allowing the use of a single mapper table.

Next, the 2 lsb's on line 111 are operated upon by phase encoder 37. Phase encoder 37 is designed to develop a rotation vector 114 using the 2 lsb's supplied by register 122. This rotation vector is output on line 116 and combined in rotator 41 with the mapped N−1 msb's on line 38 to form a phase rotated signal, thus creating the symmetric circular signal space constellation of the present invention. Optionally, phase encoder 37 includes differential phase encoder 118 which encodes the 2 lsb's of the N bit word to develop 2 differential bits. These 2 previous differential bits are output on line 119 and combined with the 2 lsb's from register 122 in adder 112 and become part of the rotation vector 114.

Rotator 41 performs vector multiplication on the rotation vector on line 116 and the mapped N−1 msb vector word on line 38 to cause a phase rotation, thus producing the final quadrant symmetric circular signal space constellation used to transmit the information including the additional special marker symbol of the present invention on line 42. The circular constellation on line 42 is supplied to scaler 43. Scaler 43 multiplies the circular constellation by a scale function of the data rate and supplies a complex number comprising X and Y values on line 47 to TX Hilbert filter 46. The scale function allows a single table to be used to implement the mapper at all data rates. TX Hilbert filter 46 operates on the signal to provide a carrierless amplitude/phase modulation (CAP) modulated signal on line 49 to digital-to-analog converter (DAC) 52. In an alternate embodiment of the present invention, the scaled circular constellation on line 47 is modulated using uncoded modulator 48, using a technique such as uncoded quadrature amplitude modulation (QAM) as is known in the art. Uncoded modulator 48 provides the sine and cosine components of a carrier frequency, or the X and Y values of the carrier frequency as is known in the art, on line 51 to multiplier 126. Multiplier 126 combines the X and Y components with the output of scaler 43 for input to TX Hilbert filter 46 which provides a bandpass output at a certain frequency range. The concepts and features of the present invention as claimed can be practiced using either CAP modulation or any coded or uncoded modulation technique such as trellis coding, QAM or PAM.

The modulated signal on line 49 is supplied to digital to analog converter 52 for conversion to an analog signal that can be transmitted conventionally at various speeds over communication channel 14 as is known in the art.

The operation of the communications system disclosed thus far, i.e., up to TX Hilbert filter 46, occurs at the symbol rate of the modem, with the symbol rate equal to the bandwidth of the modem, thus allowing the use of reduced cost components. The output of TX Hilbert filter 46 and DAC 52 are computed at the sample rate, which is typically three times that of the symbol rate.

Figure 5:
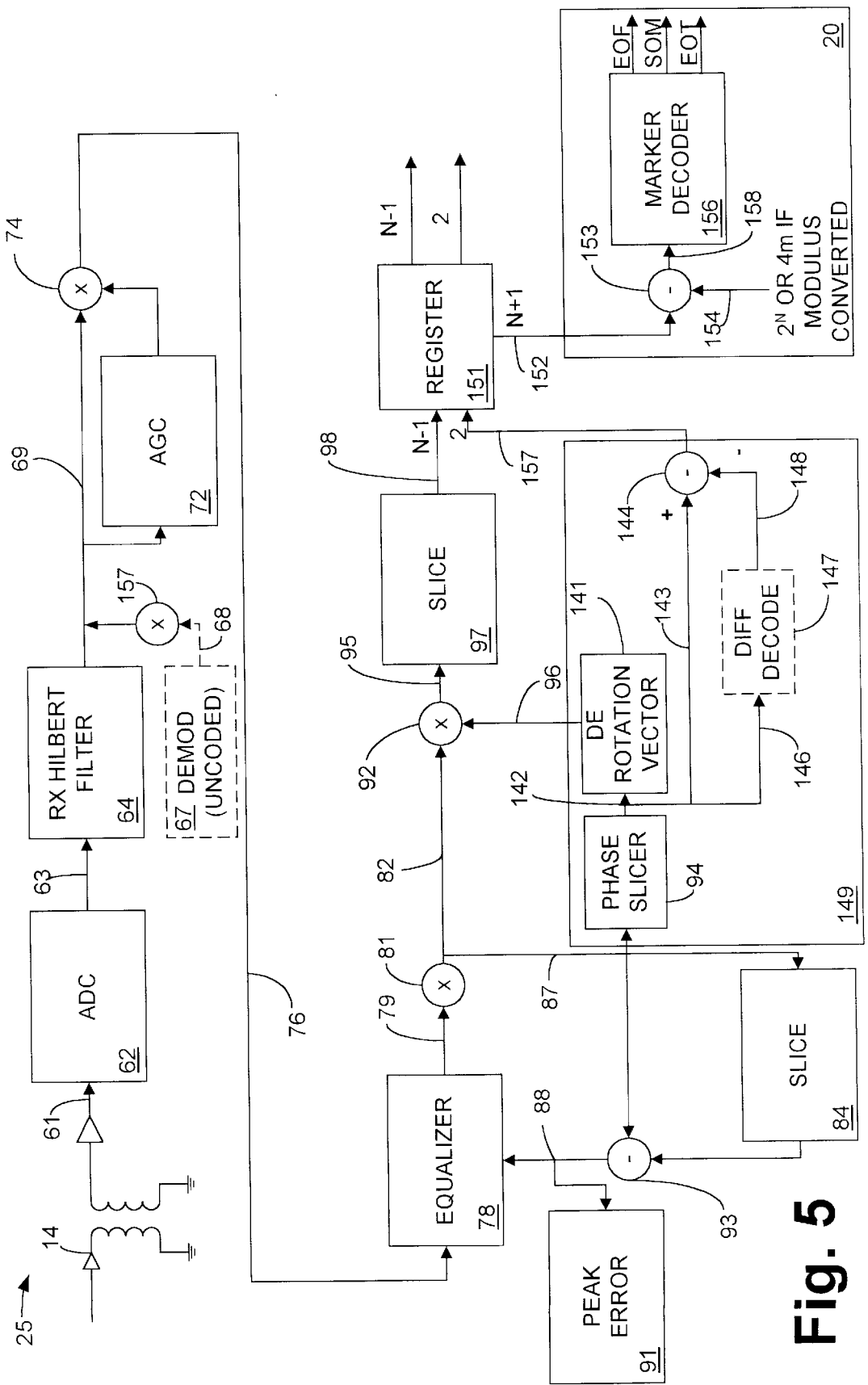
FIGS. 5 and 5A collectively illustrate a schematic view of the receiver section of the modem of FIG. 3 including the present invention.

Now referring to FIG. 5, shown is a schematic view of the receiver section 25 of the modem of FIG. 3. The received signal is input from communication channel 14 on line 61 to analog to digital converter (ADC) 62 for conversion to the digital domain as known in the art. The digital received signal is supplied on line 63 to RX Hilbert filter 64. The filtered signal is output from RX Hilbert filter 64 on line 69. In the case of uncoded modulation, uncoded demodulator 67 provides the sine and cosine components of the carrier frequency on line 68 to multiplier 157 for combination with the output of RX Hilbert filter 64. The demodulated output is provided on line 69 to automatic gain control (AGC) circuit 72. AGC circuit 72 multiplies the demodulated received signal by gain factor 74. The AGC compensated signal is then supplied on line 76 to equalizer 78. Equalizer 78 is a known in the art finite impulse response (FIR) filter with adaptive coefficients.

The equalized decoded signal is supplied on line 79 to scaler 81 which operates on the received signal with a 1/scale factor. The 1/scale factor is a function of the data rate depending on the number of points in the constellation. The output of scaler 81 is the normalized X and Y components representing the values of the symbols in the circular signal space constellation.

The normalized output of scaler 81 is supplied to slicer 84, which generates ideal reference vectors as is known in the art. Because the signal is normalized, one slicer can be used for all data rates.

The output of scaler 81 is also supplied to adder 93 along with the output of slicer 84. Adder 93 subtracts the output of scaler 81 from the output of the slicer 84 to obtain an error signal which is supplied on line 88 to update finite impulse response (FIR) filter tap coefficients of equalizer 78.

The output of scaler 81 is also supplied to phase decoder 149 on line 87. Phase slicer 94 slices the circular signal space constellation to separate the 2 lsb's for input on line 142 to derotation vector operator 141. Derotation vector operator 141 outputs a derotation vector on line 96 which is combined with the circular constellation in rotator 92. As in the transmitter, phase decoder 149 optionally includes differential phase decoder 147 to decode the 2 lsb's if they were differentially encoded in the transmitter.

Differential phase decoder 147 develops 2 differential bits in order to recover the 2 lsb's of the N bit word. The 2 differential bits are subtracted in subtractor 144 from the output of the phase slicer 94 on line 143 and input to register 151.

Differential phase decoder 147 eliminates the need for a trellis decoder, thus reducing processor cycles. In the absence of differential phase decoder 147, the 2 additional bits are passed through adder 144 on line 143 with nothing subtracted from them, essentially passing them directly to register 151. While uncoded modulation is more susceptible to errors (by approximately 3 dB) the larger bandwidth made available by the elimination of the trellis coder more than compensates for the 3 dB. That is to say by doubling the bandwidth only ½ as many bits per symbol need be transmitted, so N is really N/2 for transmitting the same data rate at double the bandwidth. Using N/2, less than half the number of points (order of 4) in the signal space constellation, i.e. removing 2 bits from N, the constellation is reduced by a factor of four, resulting in a 6 dB noise improvement. Reducing N by 1 is a 3 dB noise improvement. The improvement realized by increased bandwidth is 3N/2 dB.

Rotator 92 receives the output of scaler 81 on line 82 and the output of derotation vector operator 141 on line 96. Rotator 92 multiplies the X and Y values from scaler 81 with the derotation vector on line 96 for rotation into the base constellation subset for input to slicer 97 on line 93.

Slicer 97 performs a mathematical operation in that it masks each axis to slice the axis. Slicer 97 then multiplies one of the axes of the constellation by a scale factor, and then adds the other masked axis value to the result, thus forming an index used as an address into a table known as the eye_slicer table. The output of the table is an integer less than m where for non-fractional bit encoding, $m=2^{N-2}$ and the integer is the N−2 msb data that was originally transmitted, which is then combined with the decoded 2 lsb's from phase decoder 149 in register 151 to form the decoded N bit word. If fractional rate coding is used then a modulus converter or other method, such as constellation switching or shell mapping is used to convert M integers to the K (N−1) bit data that was originally encoded.

The additional symbol, representing the special marker symbol, included in the transmission is supplied in the form of the N+1 bit word by register 151 on line 152 to subtractor 153 where a value of $2^N$ on line 154 is subtracted from the N+1 bit word. This output on line 158 is then supplied to marker decoder 156 which will decode the special marker symbol from the received additional symbol. The detection of a special marker symbol is signaled when the value on line 158 is equal to or greater than zero.

Figure 5A:
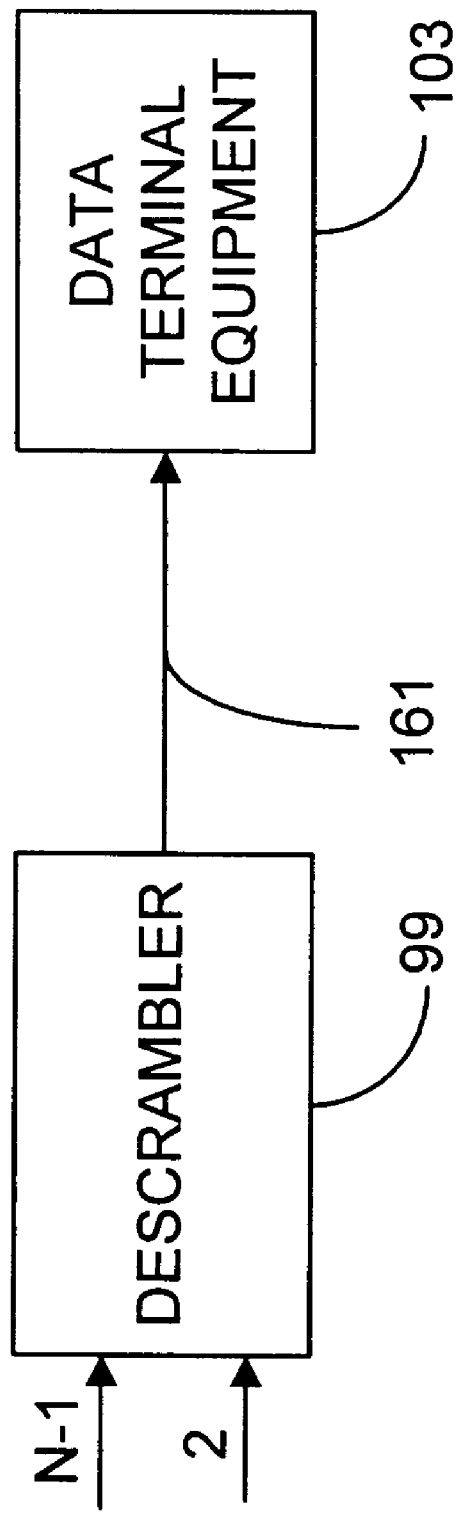

Now referring to FIG. 5A, if scrambler 32 was employed in transmitter 24, the N−1 msb's and the 2 lsb's, which are still scrambled, are supplied to descrambler 99 to be operated on to provide a descrambled N bit word on line 161 to data terminal equipment 103 as is known in the art. Descrambler 99 can be either a self synchronized scrambler or a preset free running scrambler as is known in the art similar to scrambler 32 in transmitter 24. Descrambler 99 only operates when the value on line 158 is less that zero, i.e., when no special marker symbol was detected.

Referring back to FIG. 1, square constellations, such as that illustrated in FIG. 1A encode exactly N bits in a constellation with $2^N$ points. This eliminates the possibility for transmitting any additional symbols. For example, the Tomlinson precoder used in CAP modulation requires square constellations to achieve the precoder modulo operation. Transmission of $(1+2^N)$ symbols would require a larger modulo, thus increasing the peak factor and dither power loss.

Using circular constellations, as disclosed herein and illustrated in FIG. 1B, to transmit B additional special marker symbols requires a constellation with exactly $(B+2^N)$ points. Special marker symbol 7 is illustrated in FIG. 1B as an End of File symbol, however any special marker symbol can be transmitted.

For normal data encoding the encoder uses the N−2-bit data word on line 123 as an index into the encoder table txencod shown in the program hereinafter set out in detail in appendix A. For any special marker symbol, the same table is used and the symbol "b" is encoded using the index $(b+2^N)$ where b is any integer between 0 and (B−1) allowing for exactly B special marker symbols. For differential encoding by differential phase encoder 118 the N-bit data word is partitioned into an (N−2) bit index into the table for the coordinates of the subset constellation point and the 2 least significant bits are differentially encoded and define the rotation 0, 90, 180, or 270 degrees to be applied to the subset constellation. Then, for any special marker symbol b, the index into the table is $(b/4+2^{(N-2)})$ to identify the subset point which is then rotated by phase encoding the 2 lsb's of b. The special marker symbols are used to drive phase encoder 37. For each set k of 4 or fewer special marker symbols, the subset index is $2^{(N-2)}$ where k defines the rotation and is any integer 0, 1, 2, or 3.

In the receiver, special marker symbols are detected by subtracting a value of $2^N$ from the output of slicer 97. If the result is equal to or greater than zero then a special marker symbol was received and the result is the index of the special marker symbol.

Special marker symbols should be chosen with respect to decreasing order of frequency of occurrence. The most common special marker symbol will use the lowest index, which also has the lowest power. This method beneficially reduces overall transmit power. For example, multiple files may be sent before terminating transmission. In this case, the End of File marker would be assigned index 0 (lowest power), and End of Transmission would be assigned index 3 (potentially the highest power index). Start of Message, which precedes transmission can share index 0. These special marker symbols are passed through the differential encoder or phase bits such that the first 4 markers all have the same power.

Referring back to FIG. 1B, shown is a circular constellation including special marker symbols. Included are four special marker symbols 7. As can be seen, these special marker symbols are transmitted as extra symbols in an existing circular constellation.

Set out in detail hereinafter in the attached microfiche Appendix is the program that defines the operation of the present invention.

It will be obvious to those skilled in the art that many modifications and variations may be made to the preferred embodiments of the present invention, as set forth above, without departing substantially from the principles of the present invention. For example, the circular constellation and special marker symbols of the present invention are useful in a system that uses trellis coding, and in another alternative embodiment, the equalizer of the present invention can include a decision feedback equalizer.

All such modifications and variations are intended to be included herein within the scope of the present invention, as defined in the claims that follow.

Therefore, the following is claimed:

1. A system for communication in a modem, comprising:
   a marker encoder configured to encode an additional special marker into an additional symbol;
   an adder configured to add said additional symbol to a value of $2^N$, wherein $2^N$ represents the number of points in a signal space constellation having N bits;
   a transmitter configured to transmit the output of said adder in a circular signal space constellation;
   a receiver configured to receive said circular signal space constellation and to output a received symbol;
   a subtractor configured to subtract said value of $2^N$ from said received symbol and to output a received additional symbol; and
   a marker decoder configured to decode said additional symbol into said additional special marker.

2. The system of claim 1, wherein said transmitter uses carrierless amplitude/phase (CAP) modulation.

3. The system of claim 1, wherein said transmitter uses uncoded quadrature amplitude modulation (QAM).

4. A system for sending an additional symbol in a modem, comprising:
   a marker encoder for encoding a special marker symbol into an additional symbol, said additional symbol occurring as an additional symbol in a circular signal space constellation; and
   an adder configured to add said additional symbol to a value of $2^N$, wherein $2^N$ represents the number of points in a signal space constellation having N bits.

5. The system of claim 4, wherein said additional symbol is sent using carrierless amplitude/phase (CAP) modulation.

6. The system of claim 4, wherein said additional symbol is sent using uncoded quadrature amplitude modulation (QAM).

7. A system for receiving an additional symbol in a modem, comprising:
   a marker decoder for decoding an additional symbol into a special marker symbol, said additional symbol occurring as an additional symbol in a circular signal space constellation; and a subtractor configured to subtract a value of $2^N$, wherein $2^N$ represents the number of points in a signal space constellation having N bits from said circular signal space constellation.

8. A method for communication in a modem, comprising the steps of:
   encoding an additional special marker into an additional symbol;
   adding said additional symbol to a value of $2^N$ wherein $2^N$ represents the number of points in a signal space constellation having N bits;
   transmitting the result of said adding step in a circular signal space constellation;
   receiving a symbol from said circular signal space constellation;
   subtracting said value of $2^N$ from said received symbol to output an additional symbol; and
   decoding said additional symbol into said additional special marker.

9. The method of claim 8, wherein said step of transmitting uses carrierless amplitude/phase (CAP) modulation.

10. The method of claim 8, wherein said step of transmitting uses uncoded quadrature amplitude modulation (QAM).

11. A method for sending an additional symbol in a modem, comprising the steps of:
   encoding a special marker symbol into an additional symbol, said additional symbol occurring as an additional symbol in a circular signal space constellation; and
   adding said additional symbol to a value of $2^N$, wherein $2^N$ represents the number of points in a signal space constellation having N bits.

12. The method of claim 11, further comprising the step of sending the result of said adding step using carrierless amplitude/phase (CAP) modulation.

13. The method of claim 11, further comprising the step of sending the result of said adding step using uncoded quadrature amplitude modulation (QAM).

14. A method for receiving an additional symbol in a modem, comprising the steps of:
   decoding an additional symbol into a special marker symbol, said additional symbol occurring as an additional symbol in a circular signal space constellation; and
   subtracting a value of $2^N$, wherein $2^N$ represents the number of points in a signal space constellation having N bits, from said additional symbol prior to decoding said additional symbol into said special marker symbol.

15. A computer readable medium having a program for communication in a modem, the program comprising logic for executing the steps of:
   encoding an additional special marker into an additional symbol;
   adding said additional symbol to a value of $2^N$, wherein $2^N$ represents the number of points in a signal space constellation having N bits;
   transmitting the result of said adding step in a circular signal space constellation;
   receiving a symbol from said circular signal space constellation;
   subtracting said value of $2^N$ from said received symbol to output an additional symbol; and
   decoding said additional symbol into said additional special marker.

16. The program of claim 15, wherein said step of transmitting uses carrierless amplitude/phase (CAP) modulation.

17. The program of claim 15, wherein said step of transmitting uses uncoded quadrature amplitude modulation (QAM).

18. A computer readable medium having a program for sending an additional symbol in a modem, the program comprising logic for executing the steps of:
   encoding a special marker symbol into an additional symbol, said additional symbol occurring as an additional symbol in a circular signal space constellation; and
   adding said additional symbol to a value of $2^N$, wherein $2^N$ represents the number of points in a signal space constellation having N bits.

19. The program of claim 18, further comprising the step of sending the result of said adding step using carrierless amplitude/phase (CAP) modulation.

20. The program of claim 18, further comprising the step of sending the result of said adding step using uncoded quadrature amplitude modulation (QAM).

21. A computer readable medium having a program for receiving an additional symbol in a modem, the program comprising logic for executing the steps of:
   decoding an additional symbol into a special marker symbol, said additional symbol occurring as an additional symbol in a circular signal space constellation; and
   subtracting a value of $2^N$ from said additional symbol prior to decoding said additional symbol into said special marker symbol.

* * * * *

UNITED STATES PATENT AND TRADEMARK OFFICE
CERTIFICATE OF CORRECTION

PATENT NO. : 6,137,829
DATED : 10/24/00
INVENTOR(S) : William L. Betts

It is certified that error appears in the above-identified patent and that said Letters Patent is hereby corrected as shown below:

Column 8, line 53, delete "93", and insert -- 95 --.

Signed and Sealed this

Eighth Day of May, 2001

Attest:

NICHOLAS P. GODICI

*Attesting Officer*   *Acting Director of the United States Patent and Trademark Office*